United States Patent [19]

Kornreich et al.

[11] 4,099,207
[45] Jul. 4, 1978

[54] DIRECT ELECTRONIC FOURIER TRANSFORMS OF OPTICAL IMAGES

[75] Inventors: Philipp G. Kornreich, North Syracuse; Stephen T. Kowel, Syracuse, both of N.Y.

[73] Assignee: Research Corporation, New York, N.Y.

[21] Appl. No.: 760,904

[22] Filed: Jan. 21, 1977

Related U.S. Application Data

[60] Division of Ser. No. 493,990, Aug. 1, 1974, Pat. No. 4,040,091, which is a continuation of Ser. No. 319,680, Dec. 29, 1972, abandoned.

[51] Int. Cl.² .................... H04N 3/14; G06K 9/02; H01L 31/08
[52] U.S. Cl. .................. 358/213; 340/146.3 F; 356/71; 250/211 R
[58] Field of Search ................ 315/55, 169 TV; 310/8.1, 8, 8.3, 9.7, 334; 250/211 J, 211 R, 208, 213 R; 358/213, 209, 107; 340/146.3 P, 146.3 F; 356/71; 338/15

[56] References Cited

U.S. PATENT DOCUMENTS

| 2,560,168 | 7/1951 | Goldsmith | 358/50 |
| 3,836,712 | 9/1974 | Kornreich et al. | 358/213 |
| 4,040,091 | 8/1977 | Kornreich et al. | 358/213 |

*Primary Examiner*—John C. Martin
*Attorney, Agent, or Firm*—Cooper, Dunham, Clark, Griffin & Moran

[57] ABSTRACT

Method and apparatus for directly converting between optical images and the spatial Fourier transforms of optical images by interacting sound waves and light. Controlled sound waves couple with optical images, and electrical signals may be derived from this coupling which are functions of the spatial Fourier transforms of the entire optical images. In a reverse process, optical images are obtained directly by coupling controlled sound waves with electrical signals which are a function of the spatial Fourier transforms of the optical images and with light.

17 Claims, 12 Drawing Figures

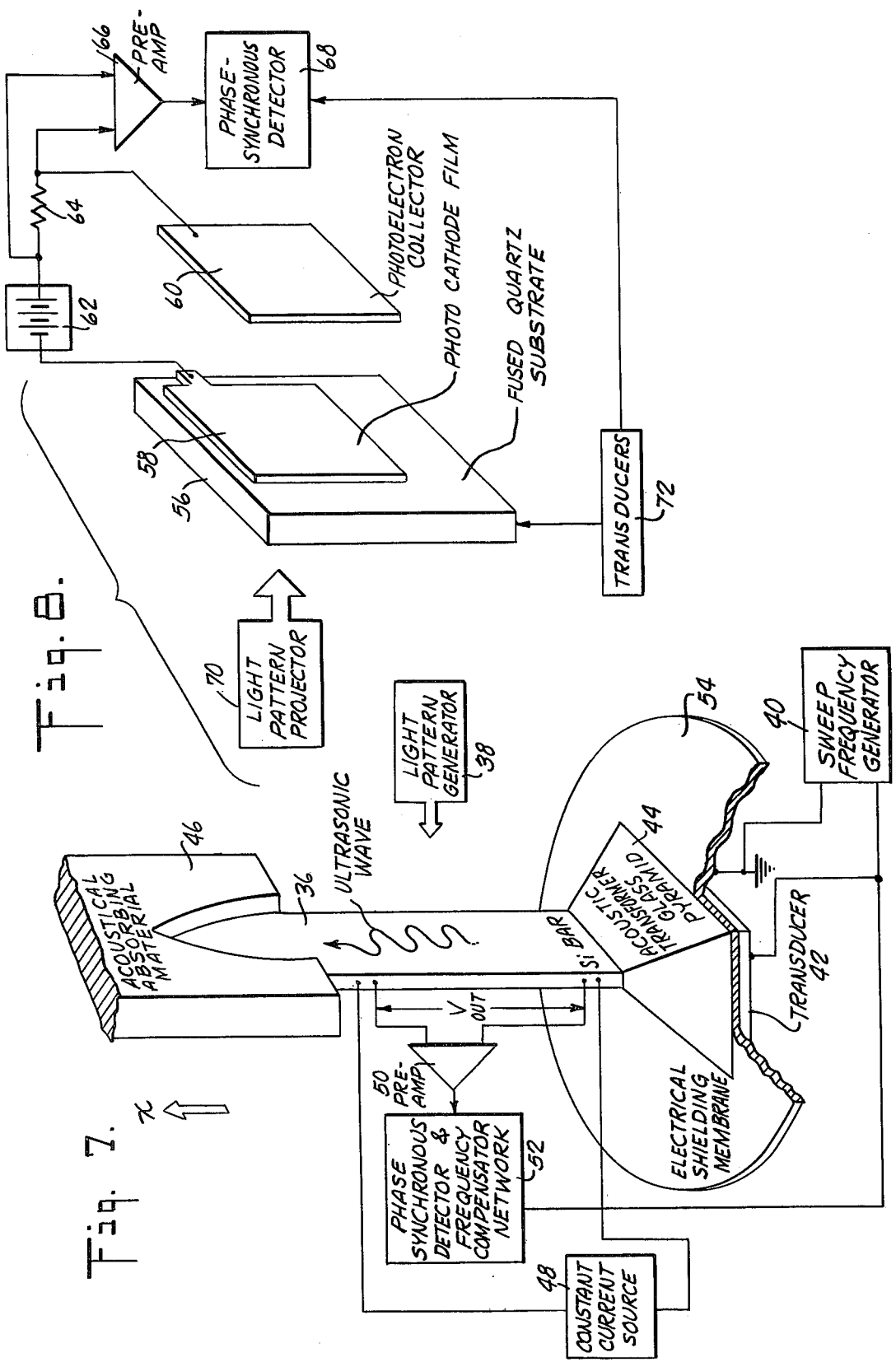

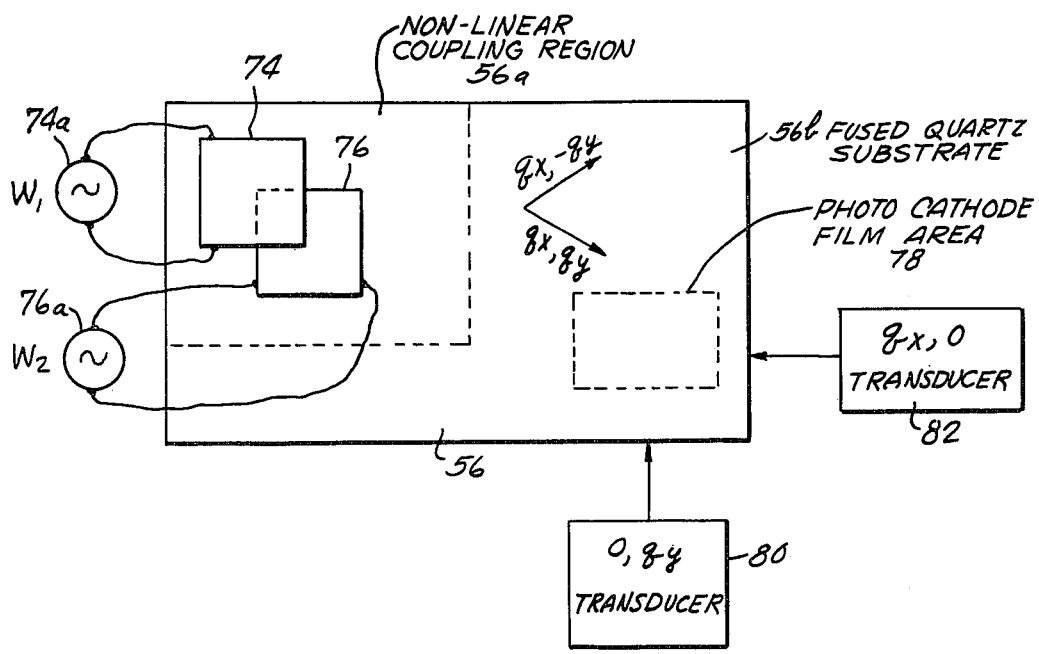
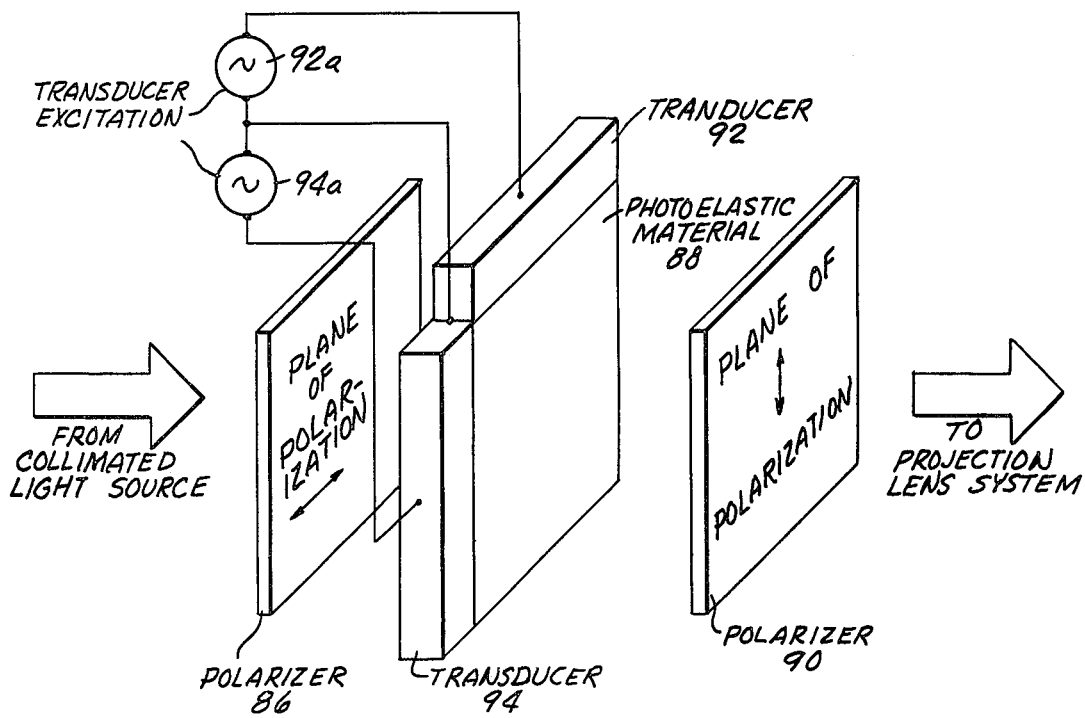

DIRECT ELECTRONIC FOURIER TRANSFORMS OF OPTICAL IMAGES

This is a division of application Ser. No. 493,990, filed Aug. 1, 1974, now U.S. Pat. No. 4,040,091, which is in turn a continuation of application Ser. No. 319,680, now abandoned.

BACKGROUND OF THE INVENTION

The invention relates to converting pictorial information into electrical signals and to converting electrical signals into pictorial information. More specifically, the invention relates to obtaining Fourier transform representations of pictorial information, and for converting such Fourier transform representations into the corresponding pictorial information. Still more specifically, the invention relates to directly converting between optical images and the Fourier transform representations of the images.

Electronic processing of pictorial information is an active field, and there are many devices for converting between pictorial information and electrical representations thereof. Such prior art devices commonly require arrays of small photosensitive elements. The individual elements of an array are sensed for changes in a photosensitive parameter when an optical image is incident on the array. This is explicitly the case in devices such as photodiode mosaics, and is implicitly the case with devices such as the Vidicon tube, where only a small region of the photosensitive surface contributes at any one time to the video signal derived from the tube. In such prior art devices, the instantaneous value of the derived electrical signal generally represents the light intensity of a particular portion of an image. Such electrical signals may be later processed, such as by analog or digital computers, into a Fourier transform representation of the signals and hence of the image represented by the signals. The Fourier transform representation is desirable, because it allows for more efficient and more versatile electronic processing of images, such as for improving image resolution, removing noise, providing electronic zoom operations, motion and speed detection, pattern recognitions, band width compression, etc.

The advantages associated with the use of Fourier transform representations of pictorial information have led to many devices for obtaining such representations. For example, there are programs for utilizing general purpose digital computers to obtain the Fourier transform representation of electrical signals, and there is a class of special purpose machines called Fast Fourier Transform Computers. Additionally, there is a laser technique for optically obtaining the Fourier transform of laser images. This laser technique is based on the observation that a planar density pattern of coherent light gives rise to its Fourier transform when the pattern is placed in the front focal plane of a lens and the result is observed in the back focal plane (see, for example, Poppelbaum, Computer Hardware theory, McMillan, 1972, pages 626 et seq.). It is emphasized that this laser technique is limited to using coherent light, and cannot be extended to conventional pictorial information which, of course, is a non-coherent and polychromatic optical image.

Because of the desirability of having Fourier transform representations of pictorial information, there is a need to obtain such representations simply and efficiently.

It is known that there are relationships between mechanical deformations of certain materials, optical images incident on the materials and electrical signals associated with the materials. One example of a device utilizing such relationships is disclosed in U.S. Pat. No. 3,200,824 issued to Yando in 1965. The patent relates to a pick-up device employing a photoconductive layer in which a light pattern projected on the layer is transformed into a series of output voltage pulses. These output pulses are produced by propagating an elastic wave accompanied by an electric field along the surface of the photoconductive layer. These output pulses give some information on the relative one-dimensional distribution of light and dark areas of the image, but provide no information about the specific light distribution of the light pattern. The pick-up device does not relate to deriving Fourier transform representations of images. Another prior art device of this type is disclosed in U.S. Pat. No. 3,412,269 issued to Crittenden, Jr. in 1968. The patent discloses a transducer translating electromagnetic wave energy to ultrasonic wave energy. The device includes a slab of cadmium sulfide which is exposed to light of a specific wave length such that alternate dark and light bands are established along the acoustic propagation axis of the cadmium sulfide. The dark and light bands are regions of high and low electrical impedance respectively. The disclosed device does not relate to conversions between optical images and Fourier series or transform representations thereof. Still another prior art device of the type is disclosed in U.S. Pat. No. 3,649,855 issued to Auld in 1972. The disclosed device relates to modulating the conversion of acoustical to electrical energy by varying a light beam illuminating the converting material. Again, the disclosed device does not relate to the conversion between optical images and Fourier transform representation thereof. In fact, applicants know of no prior art technique for directly obtaining electrical signals which are spacial Fourier transform representations of optical images.

SUMMARY OF THE INVENTION

The invention relates to converting between pictorial information and electrical representations thereof, and relates specifically to directly converting between pictorial information and Fourier transform representations thereof. It relies on the discovery that in certain configurations of certain materials, there are relationships between the electrical and mechanical properties of a material that allow deriving electrical signals representing pictorial information incident on the materials, and that applying such electrical signals to certain configurations of certain materials results in reconstructing the original pictorial information.

Specifically, the invention reflects the discovery of a coupling between controlled sound waves and optical images which allows obtaining electrical signals that are functions of the spatial Fourier transforms of the optical images, and on the discovery of a coupling between light, controlled sound waves and electrical signals which are a function of the spatial Fourier transforms of optical images which allows directly obtaining the optical images.

In accordance with the invention, such conversions between pictorial information and electrical signals representing the pictorial information are done directly, by devices which use no spatial scanning, operate at low illumination levels (with visible or infrared, coherent or incoherent light), and require neither high voltages nor high currents, such that the driving power for the sound waves may be of the order of 1 watt. Such devices are inexpensive since they make use of bulk or surface properties of materials such as common metals, semiconductors or dialectrics, and are rugged. The devices embodying the invention produce electrical signals representative of the spatial Fourier transform of pictorial information incident on the devices. Hence, these electrical signals can be used directly for sophisticated pictorial information manipulation, which is not possible with electrical signals which simply represent directly the spatial distribution of light intensity of an image. For example, the electrical signals generated by devices embodying the invention can be directly and simply processed for pattern recognition, as well as for image magnification (Zoom) and stabilization. This can be accomplished without machine computation, without camera movement and without lens adjustment. For example, shifting all Fourier transform phases by an amount which is a function of the frequency component and the desired shift translates the whole picture by a constant amount, multiplying the frequencies by a constant magnifies the picture, and combining the last two properties yields an electronic zoom capacity. Monitoring and correcting for rapid overall changes of phase in the signals generated by devices constructured in accordance with the invention allows electronic image stabilization.

One specific example of a device in accordance with the invention comprises a medium which has an electrical property that varies as a defined function of pictorial information incident on it and as a defined function of periodic mechanical deformations of the medium. The medium is subjected to a succession of different periodic mechanical deformations, and the electrical property of interest is measured at such different periodic deformations to derive a succession of electrical signals. These electrical signals serve as an electrical representation of the incident pictorial information. In particular, when the mechanical deformations are caused by vibrating the medium at a multiplicity of different frequencies, each of the electrical signals is derived at a specific vibration frequency and represents the term for that frequency of a Fourier series representation of the incident pictorial information. When the mechanical deformation is vibration of the medium through a continuous frequency range, the resulting electrical signal represents the Fourier transform (over finite bounds) of the incident pictorial information.

The fundamental principles of the invention can be illustrated by means of a device which relies on the coupling between controlled sound waves and an optical image to generate electrical signals which are functions of the spatial Fourier transform of the image. In this specification, the term "sound waves" means phonon waves of any frequency, such as from about 10 Hz to mega- or gigaHz, and is not limited to frequencies in the audible range, and the term "controlled sound waves" means sound waves in which the full wave vector is controlled in terms of magnitude and direction. The term "Fourier transform" is used generically and includes, as will become evident below, special cases of the mathematical concept of Fourier transforms, such as Fourier series or truncated Fourier transforms. The term "optical image" is used to mean spatial variations in light intensity, and the term "one-dimensional image" is used to mean an optical image in which only the variations along one dimension are of interest.

The device which may illustrate the fundamental principles of the invention comprises a fused quartz substrate and a transducer for generating a surface sound wave in the substrate. An intrinsic semiconductor film, such as CdS, is deposited over a portion of the substrate, and a pair of metal contacts are placed over the film but are separated from each other by a narrow strip of the film. An optical image is projected on the exposed strip of film, and a constant voltage difference is established between the metal contacts across that narrow strip of film. The transducer is then swept through a frequency range to vibrate the substrate, and hence the semiconductor film thereon at a discrete or continuous succession of different frequencies. The current across the film strip separating the metal contacts is measured at different frequencies. Each measured current value is representative of the term, for the particular frequency, of the Fourier transform representing the incident optical image. A number of such narrow strips of an intrinsic semiconductor film may be arranged next to each other to form a type of a two-dimensional photoconductive device whose resolution in the direction transverses to the strips' length is limited by the widths of the strips.

A device for generating an electrical signal representation of two-dimension pictorial information comprises a configuration which is similar to the one-dimensional device, but includes means for generating a controlled sound wave, which may be obtained for example by nonlinear coupling of two transducers each operating at its own frequency, with the result that sound wave beam steering may be accomplished by independently varying the frequencies of the two transducers. Alternately, a steered sound wave beam may be obtained by using the normal modes of an acoustical system.

The conversion of pictorial information into an electrical representation thereof may be accomplished alternately by utilizing bulk properties of degenerate semiconductors and metals, e.g., by making use of strain perturbation of the photoconductivity of such materials. For example, a slightly p-type silicon bar which is vibrated at different frequencies can be utilized in accordance with the invention to generate electrical signals which are Fourier transform representations of an optical image incident on the bar.

There are uses of the devices described above which do not require the reconstruction of the pictorial information represented by the electrical signals derived thereby. Pattern recognition and information transmission are two such uses. If it is required to recreate the pictorial information, two possible ways of doing so are to calculate the inverse transform of the electrical signals and to display it on currently available devices such as cathode ray tubes, or to utilize a direct solid state device constructed in accordance with the invention.

Pictorial information is reconstructed in accordance with the invention through a coupling between light, sound waves and electrical signals. This can be illustrated by a device comprising two parallel polarizing plates having an angle of 90° between their respective planes of polarization.

A plate of elasto-optical material (for example, KDP, Plexiglass, or Lithium Niobate) is sandwiched between the polarizing plates. The elasto-optical material has the property of locally changing the angle of polarization of the light passing through it when a mechanical strain is applied to it. The device further includes a transducer coupled with the elasto-optical plate to produce strain patterns whose amplitude and phase are governed by electrical signals of the type of the signals derived by the devices described above. Thus, each strain wave in the elasto-optical material plate forms a spatial Fourier component of the pictorial information which is to be reconstructed. The strain rotates the polarization locally, thus letting light through the second polarizing plate to a detecting device. The system acts like a light valve. To add the Fourier component output by this system, use is made of devices such as an acoustic delay line which adds up and recirculates the individual Fourier component sound waves until the entire inverse transform (the acoustic image) is accumulated. Then an electronic shutter or flash tube can illuminate the sound wave complex and the resulting optical image can be focused on a screen.

BRIEF DESCRIPTION OF THE DRAWINGS

FIG. 7 illustrates a different type of a device for obtaining a Fourier transform representation of a one-dimensional optical image.

FIG. 8 illustrates a device for obtaining a Fourier transform representation of a two-dimensional optical image.

FIG. 9 illustrates another device for obtaining a Fourier transform representation of a two-dimensional optical image.

FIG. 10 illustrates a device for obtaining an optical image from a Fourier transform representation of the image.

DETAILED DESCRIPTION

Before describing specific devices constructed and operating according to the invention, it may be helpful to define some of the terminology used in this specification, and to consider certain fundamentals regarding image formation and the transformation of an optical image into electrical signals which are Fourier transform representations of the image.

The optical images discussed in this specification are formed by variations in the intensity of light over a surface which is usually a planar surface. For simplicity, only a two-dimensional planar surface, in which light intensity may vary both in the X and in the Y directions is considered. A special case of such planar two-dimensional optical images is a one-dimensional image, in which light varies only along a single dimension, for example, only along the X direction. When Fourier transforms are discussed in this specification, it should be clear that it is not the pure mathematical concept of a Fourier transform, but a truncated Fourier transform, where the truncation is due to the fact that the quantities of interest are the Fourier transforms of images over finite areas. The mathematical concept of a Fourier transform involves an integral taken over indefinite bounds. However, since images of finite size are of interest to the subject invention, the integral is over finite bounds, and when the term "Fourier transform" is used, this means a transform which is truncated in some way. The term "Fourier transform" also includes a plurality of Fourier series terms. When the term "sound wave" is used in this specification, it means a wave of strain in a material, where the wave frequency can be any attainable frequency. It is emphasized that the adjective "sound" is not a limitation to audible frequencies; in fact frequencies of 10 Hz to mega- or gigaHz are useful, and frequencies of 100 kHz to 10 MHz have in fact been used. The terms "controllable sound waves" and "steered sound waves" mean sound waves in which the full wave vector (this means the magnitude and direction of the wave vector) can be changed selectively.

Figure 1:
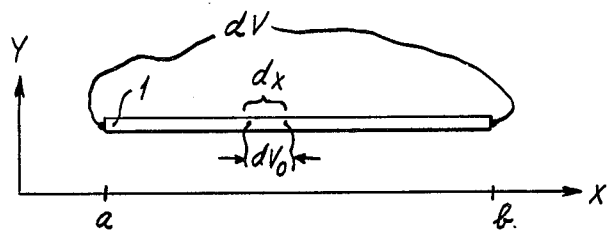
FIG. 1 is a schematic illustration used in explaining fundamental principles of the invention.

Some of the fundamental principles utilized in the subject invention may be illustrated by referring to FIG. 1 which shows schematically a one-dimensional strip 1 made of a light sensitive medium. Suppose that the light incident on an incremental segment $dX$ of the strip 1 produces a change $dV_o$ in the potential across the longitudinal ends of the incremental segment $dx$. Physical constraints require that the actual potential difference which may be sensed be across a finite length. Suppose that this length has end points $a$ and $b$. In that case, the potential difference $\Delta V_o$ sensed across the points $a$ and $b$ which define the ends of the one-dimensional photosensitive line would be $$\Delta V_o = \int_a^b \frac{dV_o}{dx} dx \qquad (e-1)$$

This relationship holds true in the case of the common photoconductive sensor. If it is assumed that the change in the voltage $dV_o$ is linear in the range of the photon flux density $\phi(X)$ of the image, then the following relationship is true $$\Delta V_o \alpha \int_a^b \phi(x)dx \qquad (e-2)$$

A standard approach to image sensing in the prior art is to juxtapose many identical elements to form an array which allows the separate sensing of each element. The subject invention moves away from this approach, and utilizes a single device which generates electrical signals representing the entire image incident on the device. To explain a fundamental relationship of the subject invention, refer again to the hypothetic one-dimensional photosensitive strip discussed above, and suppose that the change in voltage across the longitudinal ends of the incremental segment $dx$ is also dependent on a harmonic disturbance of the segment, which harmonic disturbance is in the form $$\Sigma(x,t) = \Sigma_o e^{i(kx-wt)} \qquad (e-3)$$

such that $$\frac{dV}{dx} \sim \phi(x)[1 + \gamma \Sigma(x,t)] \quad \text{(e-3)}$$

where $k$ is the propagation constant, $w$ is the temporal frequency, and is a proportionality constant. Now the voltage drop across the hypothetical strip defined by the end points $a$ and $b$ becomes $$\Delta V = \int_a^b \frac{dV}{dx} dx \propto \int_a^b \phi(x)[1 + \gamma \Sigma_o e^{i(Kx-wt)}] dx \quad \text{(e-5)}$$

The first term of the right-hand side in the above expression is simply the potential difference across the segment defined by the end points $a$ and $b$ in the absence of a harmonic disturbance. The second term in the above expression is the term of interest because it takes the form of the Fourier integral of the photon flux representing the optical image incident on the hypothetical one-dimensional strip. This second term is small, but is detectable, because it is time-varying, while the first term is not. Calling the second term of the above expression $\widetilde{\Delta V}$ results in the following expressions:

$$\widetilde{\Delta V} \propto \Sigma_o e^{-iwt} \int_a^b \phi(x) e^{iKt} dx = |\widetilde{\Delta V}| e^{-i(wt-\theta)} \quad \text{(e-6)}$$

where both the magnitude $|\widetilde{\Delta V}|$ and phase $\theta$ are dependent on the light intensity $\phi(X)$ and on the propagation constant $k$. The propagation constant $k = k(w)$ is the dispersion relation for sound waves in the material of the strip. It is seen thus that the voltage $\widetilde{\Delta V}$ has the form of the component of the Fourier transform of the light intensity distribution $\phi(X)$, where $\phi(X) = 0$ outside the end points $a$ and $b$, at the spatial frequency. The correspondence is then $$F\{\phi(x)\} \rightleftarrows |\widetilde{\Delta V}| e^{i\theta} \quad \text{(e-7)}$$

and $\widetilde{\Delta V}(w)$ represents fully the light intensity distribution $\phi(X)$ along the hypothetical line between the end points $a$ and $b$. The propagation constant $k$ is a function of the frequency.

A fundamentally important aspect of the above discussion is that since each Fourier component contains information about the entire one-dimensional strip defined by the end points $a$ and $b$, the resolution capabilities of a detector based on the above discussion is not determined by the distance between the end points, but is limited by the highest spatial frequencies which may be obtainable, and, in any specific device, by frequency response limitations of the material and of the sensing electronics. A further fundamentally important aspect is that a single device, which is many times larger than its resolution, can be used to sense an entire image.

The above discussion indicates why the availability of controlled sound waves is essential for practicing the subject invention. Since all forms of devices operating according to the invention use some form of controlled sound waves, it may be appropriate to discuss how such waves can be obtained.

In the case of one-dimensional optical images, controlling the frequency of vibration of a medium is sufficient. This can be done by vibrating a medium, such as a fused quartz substrate by means of any one of a number of conventional transducers. For example, referring to FIG. 2, a bar 2 of a suitable material, such as fused quartz is vibrated by means of a conventional transducer 3 coupled to the bar 2 by means of a wedge 4 and driven by a suitable frequency generator 5. Depending on the frequency of the electrical signal from the source 5 and depending on the relative dimensions, materials and orientation of the bar 2 and transducer 3, a surface sound wave or a bulk sound wave of a particular frequency is induced in the bar 2. The vibration of the bar 2 may be in a standing wave mode, or alternately the bar 2 may be terminated in an acoustical absorber 6. The source 5 may be a sweep frequency generator which can be swept, for example, between the frequencies of 100 kHz to 10 MHz to drive the transducer 3. However, the transducer 3 produces an output only whenever an odd multiple of half wavelength is equal the length of the transducer. Thus, the transducer 3 produces only odd harmonics. Two transducers of this type may be used, one half as long as the other, to generate a series of harmonics in which every fourth harmonic is missing. Using three transducers of the same type, each succeeding being one-half as long as the preceding one, allows the generation of a series of harmonics in which every eight harmonic is missing, etc. Alternately, thin film transducers may be used which offer better control of the output characteristics. It is noted that several harmonics of a fundamental frequency may be present in the bar 2 at any one time.

A more complex control of a sound wave is needed in the case of two-dimensional optical images. If the strain in a medium is a function of $e^{i(wt - \bar{q}_w \cdot \bar{r})}$, and $\bar{q}_w = q_x \bar{X} + q_y \bar{Y}$, both $q_x$ and $q_y$ must be selectively changeable to obtain a sound wave that can be controlled in the required manner.

One way to obtain the required two-dimensional control of sound wave utilizes the fact that many materials, both crystalline and polycrystalline, are susceptible to strain amplitudes which result in significant mixing of the waves due to force terms proportional to the square of the strain. If the strain frequencies are less than 100 MHz, a classical picture of the acoustic waves is adequate.

If two transducers $3a$ and $3b$ (see FIG. 3) driven by sources $5a$ and $5b$ respectively, are used to generate two sound waves in the same medium 2, namely, $$\Sigma_1 = A\cos(w_1 t - q_x x)$$
$$\Sigma_2 = B\cos(w_2 t + q_y y) \quad \text{(e-8)}$$

and these waves are mixed, the result of nonlinear coupling of the two waves is a wave which has four components that propagate in the original directions established by the transducers $3a$ and $3b$, and a fifth term which can be expanded to yield $$\Sigma_5 = \frac{C_5}{2} \cos[(w_1 - w_2)t - (q_x x + q_y y)] + \frac{C_5}{2} \cos[(w_1 + w_2)t - (q_x x - q_y y)] \quad \text{(e-9)}$$

where $V_1^2 q_x^2 = w_1^2$ and $V_2^2 q_y^2 = W_2^2$. Thus the sum and difference frequency terms are steerable and a controlled sound wave can be so obtained. Both $q_x$ and $q_y$ can be varied at will by changing the frequencies at which the two transducers $3a$ and $3b$ are driven by the sources $5a$ and $5b$. The multiplier $C_5$ involves the third order elastic constant and the product of the original strains AB. Note that the difference term contains the ($-\bar{q}\cdot\bar{r}$) term. The sum term contains the "conjugate" wave vector and should steer away from a region 7 in FIG. 3, which can be used as an image detecting region. The first four terms of the mixed wave should also propagate away from the image detecting region 7, leaving only the difference term to couple to a light image that may be projected on the region 7.

Another solution to the problem of obtaining two-dimensional acoustic patterns is to use the normal modes of an acoustical system. An elementary example of a solution of this type is illustrated is connection with FIG. 4. It is assumed that the system illustrated in FIG. 4 works with shear waves of a low-mode nature where there is no $z$ dependence. This is true if $$W < C_s \frac{\pi}{d} \tag{e-10}$$

Figure 4:
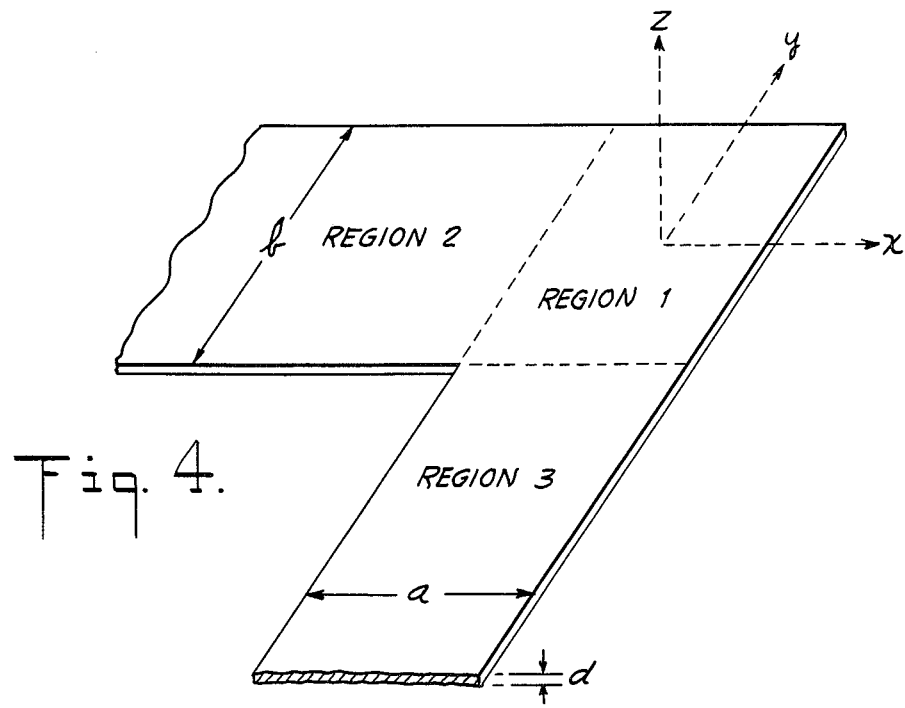

The acoustic waves in this system are shear waves with displacement $\bar{V}_i$ in the $z$ direction only, and propagation in the $x$ and $y$ directions. The equation of motion for the displacement of such a shear wave is $$\ddot{\bar{V}}_i = C_s^2 \nabla^2 V_i \tag{e-11}$$

where $C_s$ is the shear velocity of sound in the material of the substrate 2 in FIG. 4, and $i$ is the region index. The displacement in the region 1 shown in FIG. 4 can be expressed as follows:

$$\bar{V}_i = \overset{A}{a_2}[A \cos \frac{2m\pi}{a} x \cos \frac{2n\pi}{b} y + \\ b \cos \frac{2m\pi}{a} x \sin \frac{2n\pi}{b} y + D \sin \frac{2m\pi}{a} x \cos \frac{2n\pi}{b} y + \\ F \sin \frac{2m\pi}{a} x \sin \frac{2n\pi}{b} y] e^{j\omega t} \tag{e-12}$$

By substituting the expression (e-12) into the expression (e-11), the following dispersion relation can be obtained for region 1

$$\frac{w^2}{C_s^2} = \left(\frac{2m\pi}{a}\right)^2 + \left(\frac{2n\pi}{b}\right)^2 \tag{e-13}$$

By using similar expressions for the other regions shown in FIG. 4 and appropriate boundary conditions, it can be shown that B=D=F=O. Thus, a set of normal modes are obtained which can be selected by driving the regions 2 or 3 in FIG. 4 by identical transducers at the same frequency. In order to insure that no degeneracy occurs in the last expression, the ratio $a/b$ is chosen to be irrational, for example, $b = \pi/2\ a$. The constraint $w < C_s\pi/d$ can be satisfied for frequencies les than 100 MHz by choosing, for example, $d = 0.188$ mm, which is a reasonable thickness of the substrate 2 in FIG. 4. If the dimension $a$ shown in FIG. 4 is approximately 35 mm, then the expression (e-13) can be solved, for a particular material, to yield $$f = 107600 \sqrt{m^2 + \frac{4}{\pi^2} n^2} \tag{e-14}$$

for all $m$, $n$ integers.

Figure 5:
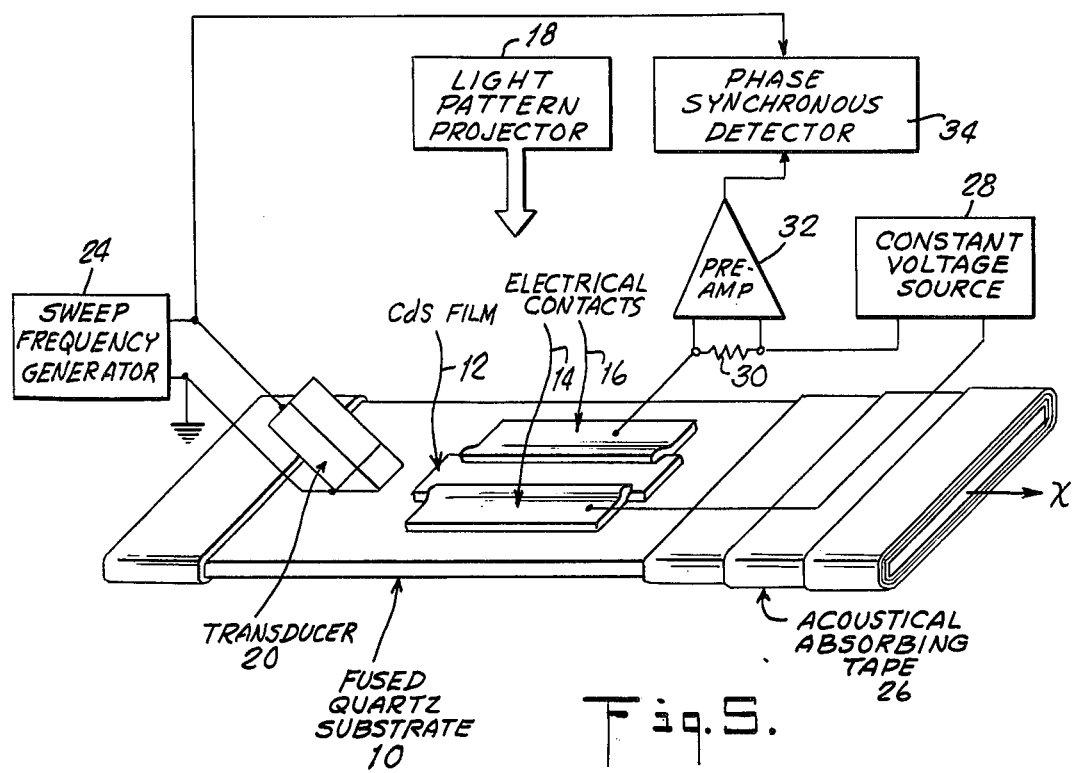
FIG. 5 illustrates a device for obtaining a Fourier transform representation of a one-dimensional optical image.

An exemplary device embodying the subject invention, as applied to the case of one-dimensional optical images, is shown in FIG. 5. The device employs sound wave modulation of the photoconductance of an intrinsic semiconductor, and generates electrical signals which are a Fourier transform representation of a one-dimensional optical image incident on a detecting strip.

Referring to FIG. 5, a substrate 10 which may be a fused quartz bar, has deposited on its top surface a film 12 of a photoconductive intrinsic semiconductor such as CdS. The film 12 is flanked and is partly overlapped by two metal contacts 14 and 16 which may be aluminum film strips and which are in electrical contact with the semi-conductor film 14. The electrical contacts 14 and 16 are spaced from each other by a small distance to expose a thin strip of the semiconductor film 12 to a light pattern projected from above the substrate 10 by a projector 18.

In one exemplary device, the exposed photodetecting strip of the semiconductor film 12 is approximately 0.006 inches wide and is approximately 15mm long, and the semiconductor film 12 is approximately 5000 Å thick. The semiconductor film in the exemplary device is polycrystalline CdS which, however, tends to have the C axis of the individual crystallites aligned perpendicular to the plane of the film 12. The film 12 exhibits no net piezoelectric effect in the plane of the film. A transducer 20 is acoustically coupled with the top surface of the substrate 10 through a Plexiglass wedge 22 and is driven by a sweep frequency generator 24. This arrangement allows the generation of a surface acoustical wave which propagates along the top surface of the substrate 10 from left to right in FIG. 1, i.e., from the transducer towards and through the region under the semiconductor film 12. The right-hand end of the substrate 10, i.e., the end which is longitudinally opposite the end on which the transducer 20 is mounted is wrapped in acoustical absorbing tape 26 which is for the purpose of absorbing substantially without reflection surface sound waves propagating toward the tape 26 from the transducer 20.

A constant potential difference is established across the electrical contacts 14 and 16 by means of a constant voltage source 28, and any variations in the conductance of the semiconductor 12 are measured by measuring the current through a resistor 30 by means of an AC isolated preamplifier 32 feeding a phase synchronous detector 34 which also receives as an input an output from the sweep frequency generator 24 that carries information about the instantaneous frequency of the generator 24. The detector 34 records an electrical signal that represents the instantaneous magnitude and phase of the current across the contacts 14 and 16.

Figure 2:
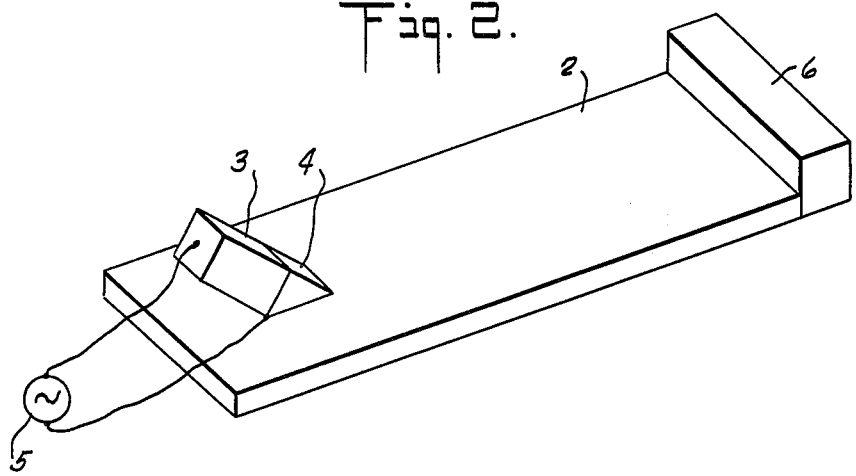
FIGS. 2, 3 and 4 illustrate obtaining controlled sound waves in a substrate.

In operation of the device illustrated in FIG. 5, the sweep frequency generator 24 is swept from, for example, 100kHz to 10 mHz, to drive the transducer 20 to generate surface sound waves as discussed in connection with FIG. 2. The conductance of the exposed strip of the semiconductor film 12, i.e., the strip which is between the contacts 14 and 16, is modulated both by the light pattern projected on it by means of the light pattern projector 18 and by the frequency of the surface wave generated by the transducer 20. At each sound wave frequency, the conductance measured across the electrical contacts 14 and 16 is representative of the term at that frequency of the Fourier series representing the entire one-dimensional light pattern from the projector 18.

As a qualitative mathematical discussion of the device of FIG. 5, assume that the conductance per unit length of the exposed strip of the semiconductor film 12 can be expressed as follows:

$$\Delta G = g_D + g_L \phi(x) + g_{DS}\Sigma + g_{LS}\phi(x)\Sigma \qquad \text{(e-15)}$$

where $g_D$ is the dark conductance in the absence of strain, $g_L\phi$ is the change in the conductance with light where $\phi$ is the photon flux in watts/m², $g_{DS}$ is the change of dark conductance with strain where $\Sigma = \Sigma g e^{j(wt-qX)}$ is the strain due to the surface wave generated on the top surface of the substrate 10 by the transducer 20, and $g_{LS}\phi(Y)\Sigma$ is the change in the conductance with light and strain.

The current $\Delta I$ per unit length of the exposed strip is then $\Delta I = \Delta G V_o$ where $V_o$ is the constant voltage applied across the electrical contacts 14 and 16 by the constant voltage source 28. The total current I measured by the preamplifier 32 and the detector 34 across the resistor 30 is then $$I = V_o \int_a^b \Delta G dx \qquad \text{(e-16)}$$

where X is along the length of the expoled strip whose longitudinal end point are $a$ and $b$. The AC component $i$ of this current is $$i = V_o \Sigma_o g_{DS}[\int_a^b e^{-jgx}dx + \frac{g_{LS}}{g_{DS}} \int_a^b \phi(x)e^{-jgx}dx] \qquad \text{(e-17)}$$

However, for the specific material used in the exemplary device in FIG. 1, namely, CdS, the dark to light conductance ratio $g_{LS}/g_{DS}$ is of the order of 300 to 1. Thus, for normal light intensities, the AC component of the current is approximately $$i \approx V_o \Sigma_o g_{LS} \int_a^b \phi(x)e^{-jgx}dx \qquad \text{(e-18)}$$

The expression (e-18) above indicates clearly that the current which is measured by the preamplifier 32 and the detector 34 is approximately proportional and corresponds to the Fourier transform of the light intensity pattern projected by means of the projector 18.

In the experimental configuration shown in FIG. 5, a specific device which has been tested has approximately 100 KΩ light resistance and generates voltage signals between 30μV and 2mV AC across a 10KΩ resistor 30. Since it is desirable to operate with lower impedances than 100KΩ several devices of the type shown in FIG. 5 may be connected in parallel, with the result being a device of the type shown in FIG. 6.

Figure 3:
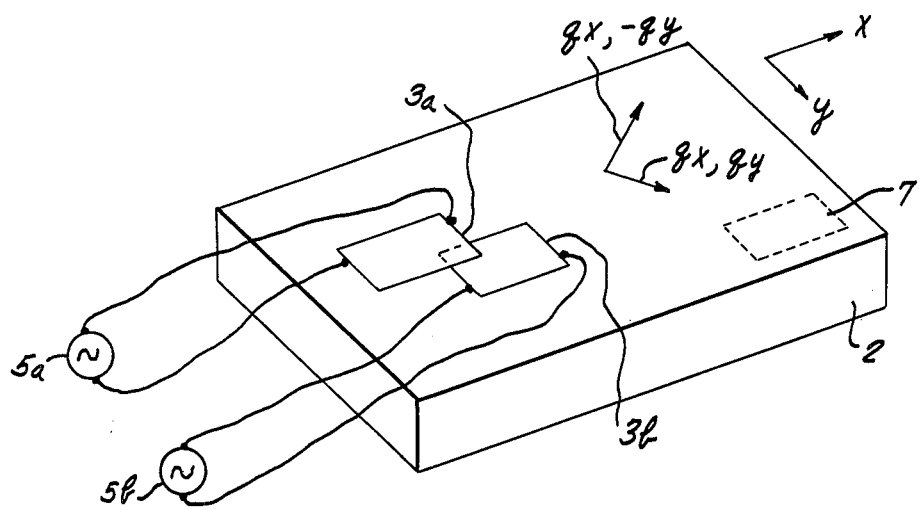
Figure 6:
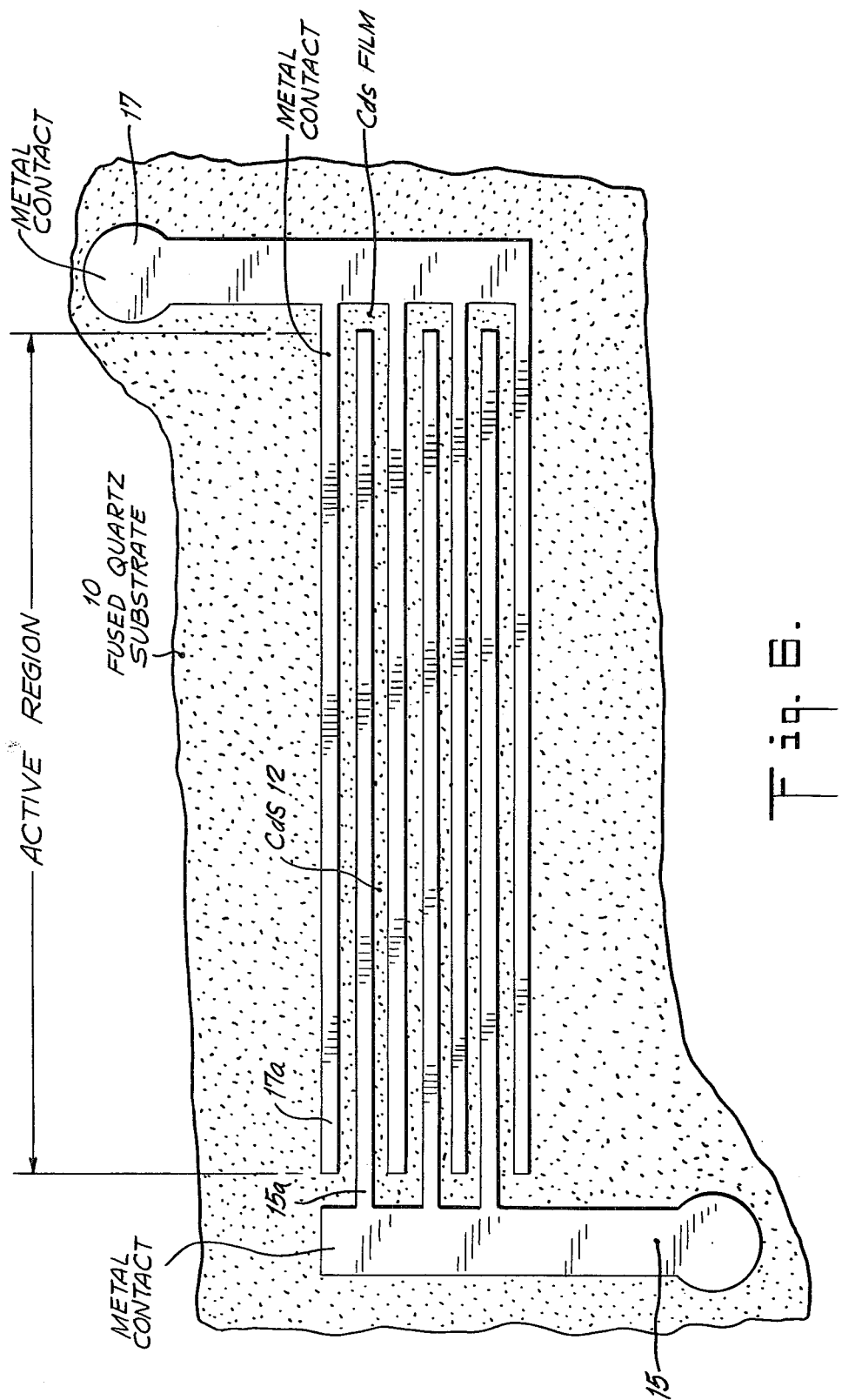
FIG. 6 illustrates a device similar to FIG. 5, but used to obtain a limited resolution second dimension of an optical image.

The device shown in FIG. 6 is similar to that shown in FIG. 5, except that the contacts 14 and 16 of the device in FIG. 5 are replaced by the contacts 15 and 17 which, as seen in FIG. 3, have interdigitated comb-tooth projections 15a and 17a forming six parallel exposed narrow strips of the semiconductor film 12. A light pattern projected on the device shown in FIG. 6 in a manner similar to the projection of a light pattern on the device shown in FIG. 5 generates in a similar manner electrical signals which are substantially the term coefficients of a Fourier series representation of the light pattern, and are therefore a Fourier transform representation of the light pattern.

A device corresponding generally to the surface effect device shown in FIG. 5, but utilizing bulk properties of certain materials, such as degenerate semiconductors and metals, is illustrated in FIG. 7. The device shown in FIG. 7 makes use of strain perturbation of the photoconductivity of a material, and comprises a bar 36 of a material such as a slightly p-type silicon, a light pattern generator 38 for projecting on the bar 36 a light image which varies only in the dimension along the length of the bar 36, means for vibrating the bar 36, means for causing a constant current flow through the bar 36 and means for detecting the potential difference across the longitudinal ends of the bar 36.

The means for vibrating the bar 36 at selected different frequencies comprise a sweep frequency generator 40 which is capable of generating frequencies from the audio range up to about 100 MHz and which drives a transducer 42 which is acoustically coupled to an acoustic transformer glass pyramid 44 that is in turn acoustically coupled to one longitudinal end of the bar 36. The opposite longitudinal end of the bar 36 is acoustically coupled to a mass of an acoustic absorbing material 46 which absorbs substantially without reflection waves propagating from the transducer 42 toward the absorbing material 46. A constant current source 48 is suitably connected to the opposite longitudinal ends of the bar 36 to establish a constant current flow through the bar 36, and a preamplifier 50 is suitably connected to the longitudinal ends of the bar 36 to measure the instantaneous potential difference therebetween. The output of the preamplifier 50 is connected to a phase synchronous detector and frequency compensator network 52 which receives as another input an output from the sweep frequency generator 40 carrying information identifying the instantaneous frequency of the generator 40. The purpose of the unit 52 becomes apparent from the discussion given below of the mode of operation of the device shown in FIG. 7. The sweep frequency generator 40, the transducer 42 and their electrical connections are electrically shielded from the rest of the device shown in FIG. 7 by means of an electrical shielding membrane 54.

In operation, the sweep frequency generator 40 is swept through a suitable range of frequencies to cause thereby bulk wave vibration of the bar 36 at a succession of different frequencies defined by the corresponding harmonics of the transducer 42. At each of these frequencies, the potential difference across the longitudinal ends of the bar 36 is detected by means of the units 50 and 52, which also detect the phase of that voltage signal relative to, for example, the signal from the generator 40. At each frequency, the voltage detected across the ends of the bar 36 corresponds to the term for that frequency of a Fourier series representation of the one-dimensional light pattern projected on the bar 36 by the light pattern generator 38.

In reality, one does not obtain the Fourer transform of the light pattern, but rather the transform of the light generated charge carrier distribution within the measured portion of the bar 36. This distribution is not identical to the light intensity pattern since the charge carriers tend to defuse away from the place where they are generated. This results in a smearing of the light pattern which causes an attenuation of the high frequency Fourier components. This can be corrected to a certain extent by a frequency compensating network which is included in the phase synchronous detector and frequency compensator network 52. The frequency compensator network simply amplifies the input signals which correspond to higher vibrational frequencies. In a specific experimental device, the bar 36 may be 3500 ohm-cm slightly p-type silicon having a charge carrier lifetime of about 3ms in a diffusion length of about 5mm. This diffusion length would limit resolution to a few millimeters.

Two-dimensional devices for generating Fourier transform representations of two-dimensional pictorial information are both more important and more complicated. Two-dimensional devices constructed and operating in accordance with the invention may employ essentially the same principles as the one-dimensional bulk effect and surface effect devices. The substantive difference between the one and two-dimensional devices is that the two-dimensional devices require a steerable controlled sound wave, so that the second dimension of the pictorial information can be obtained.

One exemplary two-dimensional device utilizes photomissivity and is shown schematically in FIG. 8. The device in FIG. 8 comprises a substrate 56 of a material such as a fused quartz plate which has deposited on one of its large faces a photocathode film 58. A photoelectron collector plate 60 is positioned parallel to the photocathode film 58 and is spaced therefrom by a suitable small distance. A constant potential difference is established between the film 58 and the collector 60 by means of a constant voltage source 62, and the emission current between the film 58 and the collector 60 is measured by means of measuring the potential difference across a resistor 64 by a preamplifier 66 feeding a phase synchronous detector 68 which also receives a frequency input from transducers 72. A light pattern is projected through the substrate 56 onto the photocathode film 58 by means of a projector 70. The substrate 56 is vibrated in suitable modes and at suitable frequencies by means of transducers 72 which are suitably coupled acoustically to the substrate 56. The device operates in vacuum.

As a possible qualitative mathematical description of the operation of the arrangement shown in FIG. 8, consider the following. Under illumination electrons are emitted from a metal plate in vacuum in accordance with the Einstein equation $$\tfrac{1}{2} m v_{max}^2 = \hbar w p - (\phi - eV) \tag{e-19}$$

where $v_{max}$ is the maximum speed of emitted electrons, $w_p$ is the frequency of light, $V$ is the applied accelerating potential, and $\phi$ is the surface work function. The current density magnitude is $$J = env = e\beta \overline{p(r)} v \tag{e-20}$$

where $n$ is the emitted electron density, $p(r)$ is the photon density absorbed, and $\beta$ is the quantum efficiency of the process. Assuming that the temperature is low and that the operation is reasonably close to cut-off, most electrons are emitted with the maximum speed $v_{max}$. The current density magnitude then becomes $$J = e\beta \overline{p(r)} \sqrt{2/m(\hbar wp - \phi + eV)} \tag{e-21}$$

when a strain is propagated through the metal of the form $$\Sigma_{ij} = \Sigma_{ij}^o e^{j(wt - \bar{q}_w \bar{r})} \tag{e-22}$$

where $q_w$ is the wave vector related to $w$ by the strain dispersion relation. This strain provides a local variation in the work function $\phi$ by varying the Fermi energy. Expanding the work function to first order in strain, the following expression is obtained:

$$\phi = \phi_0 + \frac{\delta \phi}{\delta \Sigma_{ij}^0} \Sigma_{ij} \tag{e-23}$$

where summation over like indices is assumed throughout. This may be written as $$\phi = \phi_0 (1 + \frac{1}{\phi} \frac{\delta \phi}{\delta \Sigma_{ij}^0} \Sigma_{ij}) \tag{e-24}$$

The change in the work function with strain is due to the change of the Fermi energy when strained since the vacuum level is fixed. Thus $$\frac{\delta \phi}{\delta \Sigma_{ij}} = \frac{\delta \mu}{\delta \Sigma_{ij}^0} \tag{e-25}$$

where $\mu$ is the Fermi energy. The value of this change can be calculated and it can be shown that this perturbation of $\phi_o$ is small, but measurable. If the system is arranged so that $$\hbar wp + eV - \phi_o \gg \gamma \phi \tag{e-26}$$

where $$\delta = (1/\phi_o)(\delta\phi/\delta\Sigma_{ij}) \Sigma_{ij}^o = \gamma_o e^{-j(wt \cdot q_n \cdot r)}. \tag{e-26}$$

The following expression can be calculated for the total current collected:

$$I = I_0 - \frac{e\beta \sqrt{\frac{2}{m}} e^{jwt} \gamma_0 \phi_0}{2(\hbar wp + eV - \phi_0)^{\frac{1}{2}}} \int p(\bar{r}) e^{-j\bar{q}_w \cdot \bar{r}} d^2\bar{r} \tag{e-27}$$

where the integral is over the area of the photoemitter.

From the above expression, it is seen that the component of the current which varies at the strain frequency $w$ is proportional to the $q_w$ component of the Fourier transform of the light intensity. Detecting the AC component and scanning in $w$ provides the entire transform. By including a photomultiplier, the parameter $\beta$ can be manipulated to obtain the required sensitivity.

The principles discussed above are applicable to the arrangement shown in FIG. 8, where electrons are emitted from the photocathode film 58 under the effect of the light pattern projected from the projector 70 and under the effect of the strain induced by means of the transducers 70, and the current is the current through the resistor 64 as measured by the detector 68.

It should be apparent from the qualitative mathematical discussion above that the derivation of the output signal, namely, the current through the resistor 64 in FIG. 8, involves integrals whose intergrands contain products of the intensity distribution of the image projected onto the photocathode film 58 and the strain deformation of the substrate 56. If the strain is proportional to $e^{j(wt - \bar{q}_w \cdot \bar{r})}$, the detected current signal should be proportional to the two-dimensional Fourier transform, where $\bar{q}_w = q_x \hat{x} + q_y \hat{y}$. This condition requires steering of the acoustical beam causing deformation of the substrate 56. In particular, $q_x$ and $q_y$ must be changeable essentially by varying the frequencies of the electrical signals that may be used to drive the transducers 72, as discussed earlier in connection with FIGS. 3 and 4.

When the device illustrated in FIG. 8 is used for converting pictorial information into an electrical signal representation thereof, it is not necessary to geometrically separate the various components of the strain wave, since the difference frequency can be detected in a simple manner and the other signal components can be disregarded. However, in devices for converting from electrical signal representations of pictorial information into pictorial information, no frequency discrimination is possible, and any sound wave in the device will modulate the output pictorial information. It is therefore necessary to find means by which it would be possible to geometrically separate the various components of the strain wave in the substrate. One possible method is illustrated in FIG. 9, and comprises a substrate 56 similar to the substrate 56 in FIG. 8 and transducers 74 and 76 which are acoustically coupled to the substrate 56 and are driven respectively by sweep frequency generators 74a and 76a whose frequencies are independently variable. The strains induced in the substrate 56 by means of the transducers 74 and 76 couple nonlinearly (in the manner discussed in connection with FIG. 3) in a region 56a and couple linearly in a region 56b. The unmixed strain waves induced by the transducers 74 and 75 propagate away from a photocathode film area 78 which is in the linear mixing region 56b, while the difference strain wave passes through the photocathode film area 78. The special cases $(q_x,O)$ and $(O,q_y)$ can be obtained by inducing a strain wave in the substrate 56 by means of one of the transducers 80 and 82 which are appropriately labelled.

A device equivalent to the two-dimensional device shown in FIG. 8, but relying on the strain dependence of photoconductance and utilizing the basic principles discussed in connection with the device of FIG. 5 requires a steerable acoustic wave and must take into account the fact that the resistance of a rectangular plate is not proportional to its area, that is the product of its dimension, but is proportional rather to the ratio of its dimension. A one-dimensional device does not present this difficulty since we allow no variation in the direction transverse to the current. A two-dimensional device, however, must have provisions for taking into account this fact.

Pictorial information which has been converted to the electrical representation discussed above can be recreated either by calculating the spatial pattern (inverse transform) and displaying it on currently available devices such as cathode ray tubes, or by using a direct solid state projector constructed and operating in accordance with another aspect of the invention.

A pictorial information reconstruction system is illustrated in FIG. 10 and comprises polarizing plates 86 and 90 and a plate 88 of photoelastic material which is located intermediate the polarizing plates 86 and 90. The planes of polarization of the plates 86 and 90 are at a 90° angle to each other. For example, the polarization plane of the plate 86 is in the horizontal direction while the polarization plane of the plate 90 is in the vertical direction. The intermediate plate 88 is of a photoelastic material, such as for example, KDP or Plexiglass and has the property of locally changing the angle of polarization of light passing through it when a mechanical strain is applied to it. This property of elasto-optical materials is well recognized; for example, KDP is used as a light modulator in quantum electronics and Plexiglass is used to demonstrate stress patterns in various mechanical components. Electro-mechanical transducers 92 and 94 are acoustically coupled with the plate 88 to produce strain patterns similar to the strain patterns discussed in connection with FIGS. 3 and 4. The amplitude and phase of the strain patterns are governed by electrical signals supplied by signal generators 92a and 94a whose outputs are in turn governed by electrical signals of the type derived by the detector 68 in FIG. 8. Thus, each strain wave in the elasto-optical material plate 88 forms a spatial Fourier component of the pictorial information which is to be reconstructed by the arrangement shown in FIG. 10. This strain rotates the polarization locally, thus letting light through the polarization plate 90 which light comes from a collimated light source to the left (in FIG. 10) of the polarization plate 86. The light which is transmitted through the polarization plate 90 can be applied, as a signal, to an acoustic delay line which adds up and recirculates the individual Fourier component sound waves applied to it until the entire inverse transform (the acoustic image) of a particular optical image is accumulated. Then an electronic shutter or flash tube can illuminate the sound wave complex and the optical image can focus on a screen. The plate 88 may be of materials such as lithium niobate.

Figure 11:
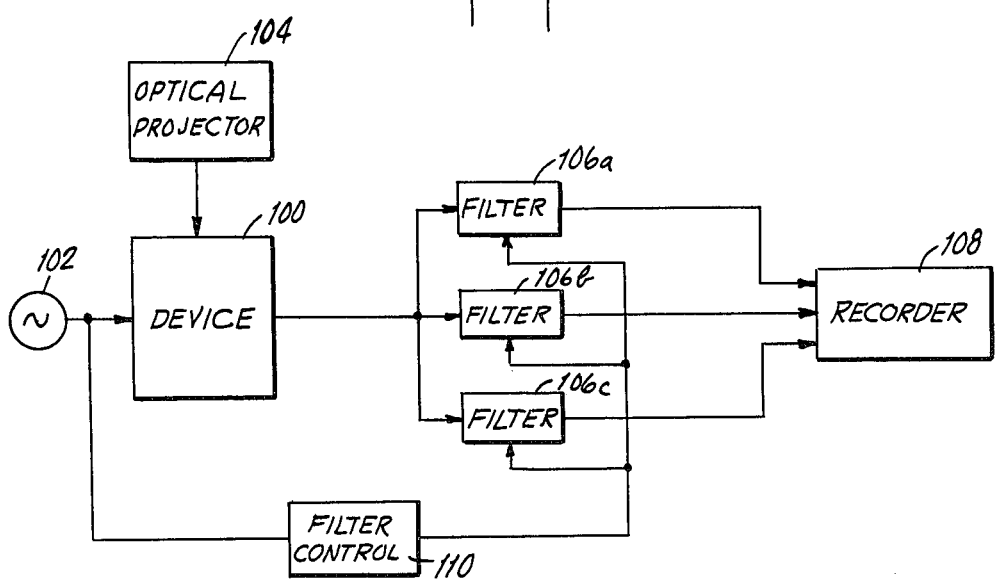
FIG. 11 illustrates a different form of an output deriving means useful in connection with the devices shown in FIGS. 5 through 9.

In connection with the devices illustrated in FIGS. 5 through 9, it should be noted that in many cases the substrate material vibrates at a fundamental frequency and simultaneously vibrates at one or more harmonics of that fundamental frequency. This can be utilized advantageously in simultaneously deriving electrical signals representative of the Fourier transforms for these several simultaneous frequencies. Thus, referring to FIG. 11, the block 100 labelled device represents for example the device shown in FIG. 5 and is vibrated by means of a source 102. An optical projector 104 projects an optical image on the device 100. At each frequency of vibration of the device 100, the output signal derived from the device 100 is a Fourier transform representation of the optical image projected on the device 100 by the optical projector 104. However, since the device 100 in fact vibrates at a fundamental frequency and one or more detectable harmonics of that fundamental frequency, it is advantageous to simultaneously detect the output at each of these several different frequencies of vibration of the device 100. Accordingly, the output of the device 100 is directed simultaneously to a number of frequency filters, for example, frequency filters 106a, 106b, and 106c. Each of the frequency filters passes only a frequency band corresponding to the fundamental frequency or to one of the detectable harmonics of the fundamental frequency of vibration of the device 100. Thus, each of the frequency filters provides an output which is an electrical signal representative of the Fourier transform corresponding to the frequency within the band pass of the filter. These output signals of the filters are recorded at a recorder 108. The filters 106a, 106b, and 106c are controlled by a filter control 110 which receives an input from the source 102 and provides outputs which determine the band pass frequency of the filters. For example, the filter 106a may be set by means of the filter control 110 to pass only electrical signals which correspond to the instantaneous fundamental frequency of vibration of the device 100, the filter 106b may be set to pass only electrical signals which correspond to a given harmonic of that instantaneous fundamental frequency of vibration, and the filter 106c may be set to pass only electrical signals which correspond to another harmonic of the instantaneous fundamental frequency of vibration of the device 100.

Figure 12:
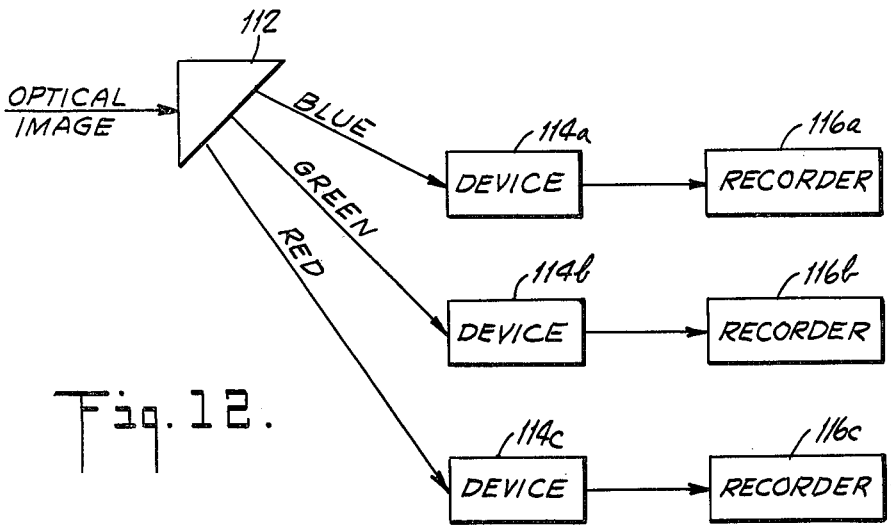
FIG. 12 illustrates the use of devices of the type shown in FIGS. 5 through 9 for obtaining a Fourier transform representation of a color image.

So far, an optical image was considered as represented by the spatial distribution of light intensity forming the image. However, the devices discussed above may be utilized in a system for obtaining a Fourier transform representation of a color image, by means of a system of the type illustrated in FIG. 12. In FIG. 12, an optical image produced by a projector of the type discussed in connection with FIG. 5 is projected toward a device 112, such as a common prism, for separating the optical image into the three primary additive colors, blue, green and red. The result is three separate optical images, each in only one of the primary additive colors. A device of the type shown in FIGS. 5 through 9, for example a device of the type shown in FIG. 5, is provided for each of these three colors. For example, a device 114a is provided for obtaining the Fourier transform representation of the blue portion of the image, a device 114b is provided for obtaining the Fourier transform representation of the green portion of the image, and a device 114c is provided for obtaining the Fourier transform representation of the red image. Corresponding recording devices 116a, 116b and 116c are provided to record the electrical signal's output by the devices 114a, 114b and 114c respectively.

We claim:

1. A device for generating an electrical signal representation of an optical image comprising:
   a medium having an electrical property which varies as a function of an optical image formed on the medium and as a function of time and space varying strain disturbances in the medium, said medium being made of a material selected from the group consisting of degenerate semiconductors and metals;
   means for forming an optical image on the medium;
   means for causing a plurality of different time and space varying strain disturbances in the medium; and
   means for measuring said electrical property of the medium at a plurality of said different strain disturbances in the medium while the image is formed on the medium to derive a plurality of electrical signals, each signal representing an aspect of the entire image rather than of a point or an elemental area of the image, said measuring means including means for establishing a constant current across a portion of the medium and means for detecting the potential difference across at least a part of said portion of the medium at a plurality of said different strain disturbances in the medium while the image is formed on the medium.

2. A device as in claim 1 wherein said different strain disturbances in the medium are strain waves of different spatial wavelengths propagating in the medium.

3. A device as in claim 1 wherein said strain disturbances in the medium are bulk strain waves propagating in the medium.

4. A device as in claim 1 wherein the measuring means comprises means for deriving electrical signals each of which is a Fourier transform representation of the image corresponding to a particular strain disturbance in the medium.

5. A device as in claim 1 wherein the medium is formed of a continuous, solid, substantially homogeneous material capable of propagating strain waves induced therein and having an electrical property which varies as a Fourier transform function of an optical image formed on the medium and of strain waves propagating in the medium.

6. A device as in claim 5 wherein the medium comprises essentially a bar of silicon material.

7. A device as in claim 1 wherein the means for measuring the electrical property comprises means for deriving electrical signals each of which represents a selected component of a Fourier transform representation of a single dimension of the optical image.

8. A device as in claim 1 wherein the measuring means includes means for measuring the magnitude of said electrical property of the medium and the phase of said electrical property relative to the strain disturbances present in the medium to thereby derive electrical signals representing both the magnitude and the phase of said property, said electrical signals representing the optical image.

9. A device as in claim 1 wherein the means for causing strain disturbances comprise means for causing a plurality of strain waves of different spatial wavelengths to be concurrently present in the medium and the measuring means include means for deriving an electrical signal corresponding to each of the concurrently present strain waves, said electrical signal representing a Fourier transform representation of the image corresponding to said concurrently present strain waves.

10. A device for generating an electrical signal representation of an optical image comprising:
    a medium having an electrical property which varies as a function of an optical image formed on the medium and as a function of strain disturbances present in the medium;
    means for forming an optical image on the medium;
    means for causing a plurality of strain waves of different spatial wavelengths to be concurrently present in the medium; and
    means for measuring the electrical property of the medium at each of said plurality of different strain waves to derive a corresponding plurality of electrical signals each of which represents an aspect of the entire optical image rather than of a point or an elemental area of the image.

11. A device as in the claim 10 wherein each of said strain waves in the medium is a bulk strain wave.

12. A device as in claim 10 wherein the measuring means includes means for deriving electrical signals each of which represents a Fourier transform component of the optical image.

13. A device as in claim 10 wherein the measuring means includes means for measuring the magnitude of the electrical property of the medium corresponding to each of said strain waves and the phase of the electrical property of the medium corresponding to each of said strain waves and relative to the phase of the corresponding strain wave.

14. A method of deriving an electrical signal representation of an optical image comprising the steps of:
    forming an optical image on a medium having an electrical property which varies as a function of the optical image formed on it and as a function of strain disturbances present in it;
    causing a plurality of different strain disturbances in the medium; and
    measuring the electrical property of the medium at a plurality of said different strain disturbances in the medium to derive a plurality of electrical signals each corresponding to a different strain disturbance and each representing the entire optical image formed on the medium, said measuring means including means for maintaining a constant current through a selected portion of the medium and for deriving said electrical signals by measuring the potential difference across said selected portion of the medium.

15. A method as in claim 14 wherein the step of causing the strain disturbances comprises causing bulk strain waves propagating through the medium.

16. A method as in claim 14 wherein the measuring step comprises measuring the electrical property to derive electrical signals each of which is a Fourier representation component corresponding to a different strain disturbance in the medium.

17. A method as in claim 14 wherein the measuring step comprises measuring the magnitude of the electrical property corresponding to each of the different strain waves and measuring the phase of the electrical property corresponding to each different strain disturbance and relative to the phase of the corresponding strain disturbance.

* * * * *